US012058569B2

(12) United States Patent
Yang et al.

(10) Patent No.: US 12,058,569 B2
(45) Date of Patent: Aug. 6, 2024

(54) METHOD AND APPARATUS FOR ACQUIRING VEHICLE TO EVERYTHING COMMUNICATION POLICY

(71) Applicant: GUANGDONG OPPO MOBILE TELECOMMUNICATIONS CORP., LTD., Dongguan (CN)

(72) Inventors: Haorui Yang, Dongguan (CN); Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/205,477

(22) Filed: Jun. 2, 2023

(65) Prior Publication Data

US 2023/0319641 A1 Oct. 5, 2023

Related U.S. Application Data (63) Continuation of application No. 17/529,131, filed on Nov. 17, 2021, now Pat. No. 11,722,932, which is a
(Continued)

(51) Int. Cl.
*H04W 28/16* (2009.01)
*H04W 4/40* (2018.01)
*H04W 72/20* (2023.01)

(52) U.S. Cl.
CPC .............. *H04W 28/16* (2013.01); *H04W 4/40* (2018.02); *H04W 72/20* (2023.01)

(58) Field of Classification Search
CPC ...... H04B 7/26; H04W 4/00; H04W 4/40–48; H04W 28/0205; H04W 28/16;
(Continued)

(56) References Cited

U.S. PATENT DOCUMENTS

| 2019/0037448 A1 | 1/2019 | Shan et al. |
| 2019/0289459 A1 | 9/2019 | Shan |

FOREIGN PATENT DOCUMENTS

| CN | 106559443 A | 4/2017 |
| CN | 106658351 A | 5/2017 |

(Continued)

OTHER PUBLICATIONS

International Search Report and Written Opinion dated Jun. 24, 2020 in International Application No. PCT/CN2019/107588. English translation attached.
(Continued)

*Primary Examiner* — Thomas R Cairns (74) *Attorney, Agent, or Firm* — Sheppard, Mullin, Richter & Hampton LLP (57) ABSTRACT

An embodiment of the present disclosure provides a method for obtaining a Vehicle to Everything Policy (V2XP). The method includes: transmitting, by a terminal device, at least one of first information and second information to a Policy Control Function (PCF), the first information being used for requesting a configuration of a policy for V2X communication over a PC5 interface, and the second information being used for requesting a configuration of a policy for V2X communication over a Uu interface; and receiving, by the terminal device from the PCF, at least one of the policy corresponding to the first information and the policy corresponding to the second information.

20 Claims, 3 Drawing Sheets

Related U.S. Application Data continuation of application No. 17/333,652, filed on May 28, 2021, now Pat. No. 11,228,945, which is a continuation of application No. PCT/CN2019/107588, filed on Sep. 24, 2019.

(58) Field of Classification Search
CPC ........... H04W 28/18–26; H04W 47/70; H04W 72/00; H04W 72/12; H04W 72/20–25; H04W 76/14; H04W 76/23; H04W 84/005; H04W 92/10; H04W 92/18
See application file for complete search history.

(56) References Cited

FOREIGN PATENT DOCUMENTS

| | | |
|---|---|---|
| CN | 109068297 A | 12/2018 |
| CN | 110169160 A | 8/2019 |
| CN | 110178389 A | 8/2019 |
| CN | 110351683 A | 10/2019 |
| WO | 2019157961 A1 | 8/2019 |

OTHER PUBLICATIONS

Ericsson et al. "USPS extension for V2X policy" CI-194848, 3GPP TSG-CT WGI Meeting #119, Aug. 30, 2019 (Aug. 30, 2019), p. 1.
3GPP. "Technical Specification Group Services and System Aspects; Architecture enhancements for 5G System (5GS) to support Vehicle-to-Everything (V2X) services (Release 16)" 3GPP TS 23.287 V2.0.0, Aug. 31, 2019 (Aug. 31, 2019), entire document.
3GPP. "Technical Specification Group Core Network and Terminals; Vehicle-to-Everything (V2X) services in 5G System (5GS); User Equipment (UE) policies; Stage 3 (Release 16)" 3GPP TS 24.588 V0.2.0, Sep. 10, 2019 (Sep. 10, 2019), entire document.
OPPO. "UE requested V2XP update procedure" CI-196074, 3GPP TSG-CT WG1 Meeting #120, Oct. 11, 2019 (Oct. 11, 2019), p. 3.
European Search Report dated Nov. 19, 2021 in European Patent Application No. 19947291.1.
Lenovo et al: " Clarification on V2X policy communication parameters provisioning ", 3GPP Draft; S2-1905614_PCR_EV2X_UE_POLICY, 3rd Generation Partnership Project (3GPP), Mobile Competence Center ; 650, Route Des Lucioles ; F-06921 Sophia-Antipolis Cedex ; France, vol. SA WG2, No. Reno, USA; May 13, 2019-May 17, 2019, May 17, 2019 (May 17, 2019), XP051735810.
Motorola Mobility et al: "Distribution of V2X related configuration to the UE using UE Policy Delivery mechanism", 3GPP Draft; S2-1903689_V2X_PSI_0_32503, 3rd Generation Partnership Project (3GPP), Mobile Competence Centre ; 650, Route Des Lucioles ; F-06921 Sophia-Antipolis Cedex; France, vol. SA WG2, No. Xi'an, China; Apr. 8, 2019-Apr. 12, 2019, Apr. 12, 2019 (Apr. 12, 2019), XP051719835.
Intel et al: "Clarification on condition of including UE Policy Container in RR message", 3GPP Draft; 23503_CR0203R1_5GS_PH1_(REL-15)_S2-1901121 (WAS 0423) 23.503 CR Clarification on Condition of Including UE Policy Container in RR Message V1, 3rd Generation Partnership Project (3GPP), Mobi, vol. SA WG2, No. Kochi, India; Jan. 21, 2019-Jan. 24, 2019, Jan. 25, 2019 (Jan. 25, 2019), XP051688449.
Lenovo et al: "V2X Group Key Provisioning", 3GPP Draft; S3-192741, 3rd Generation Partnership Project (3GPP) , Mobile Competence Centre; 650, Route Des Lucioles; F-06921 Sophia-Antipolis Cedex; France, vol. SA WG3, No. Wroclaw (Poland) ; Aug. 26, 2019-Aug. 30, 2019, Aug. 30, 2019 (Aug. 30, 2019), XP051776577.
Examination report dated May 3, 2022 received in European Patent Application No. EP 19947291.1.
"Technical Specification Group Core Network and Terminals; Non-Access Stratum (NAS) protocol for 5G System (5GS); Stage 3 (Release 16)", Sep. 23, 2019, XP051781955.
Intel et al: "UE triggered UE policy provisioning procedure", 3GPP Draft; S2-1900425 23.502 CR UE Triggered UE Policy Provisioning Procedure V2, Jan. 25, 2019, XP051590101.
First Examination Report (FER) dated May 2, 2022 received in Indian Patent Application No. IN202127025078.
First Office Action from corresponding Chinese Application No. 2021107456763, dated Sep. 14, 2022. English translation attached.
Summons to attend oral proceedings dated Oct. 19, 2022 received in European Patent Application No. EP19947291.1.
Grant Notice & Supplementary Search from corresponding Chinese Application No. 202110745676.3, dated Jan. 5, 2023. English translation attached.
Motorola Mobility et al. "Distribution of V2X related configuration to the UE using UE Policy Delivery mechanism" S2-1903690, 3GPP tsg_sa\ wg2_arch, Apr. 2, 2019, full text.
Motorola Mobility et al."Clarification on V2X policy communication parameters provisioning" S2-1907665; 3GPP tsg_sa\ wg2_arch, Jun. 28, 2019, full text.
Grant Notice for EP application 19947291.1 issued May 4, 2023.
The First Office Action dated Jun. 20, 2023 received in Japanese Patent Application No. JP2021-526598.English translation attached.
Ericsson et al., V2X capability and V2X PC5 capability[online], 3GPP TSG CT WG1 #119 C1-195049, Internet<URL: https://www.3gpp.org/ftp/tsg_ct/WG1_mm-cc-sm_ex-CN1/TSGC1_119_Wroclaw/Docs/C1-195049.zip>.
LG Electronics et al, Supporting cross-carrier operation for V2X communication over PC5[online], 3GPP TSG CT WG1 #105 C1-17 3248, Internet<URL:http://www.3gpp.org/ftp/tsg_ct/WG1_mm-cc-sm_ex-CN1/TSGC1_105_Krakow/docs/C1-173248.zip>, Aug. 14, 2017.
The Grant Notice dated Oct. 3, 2023 received in Japanese Patent Application No. JP2021-526598.English translation attached.
Extended European Search Report dated Nov. 3, 2023 received in European Patent Application No. EP23195222.7.
Grant Notice dated Sep. 28, 2023 received in European Patent Application No. EP19947291.1.
The First Office Action from corresponding Korean Application No. 10-2021-7015273, dated Jan. 24, 2024. English translation attached.

METHOD AND APPARATUS FOR ACQUIRING VEHICLE TO EVERYTHING COMMUNICATION POLICY

CROSS-REFERENCE TO RELATED APPLICATION

The present application is a continuation of U.S. application Ser. No. 17/529,131, filed on Nov. 17, 2021, which is a continuation of U.S. application Ser. No. 17/333,652, filed on May 28, 2021, which is a continuation of International Application No. PCT/CN2019/107588, filed on Sep. 24, 2019. The entirety of the above-mentioned patent applications is hereby incorporated by reference herein and made a part of this specification.

TECHNICAL FIELD

The present disclosure relates to the field of communication, and more particularly, to a method and apparatus for obtaining a vehicle to everything communication policy.

BACKGROUND

The 5th-generation (5G) mobile communication system supports Vehicle to Everything (V2X) communication. The V2X communication is a sidelink transmission technology. One terminal device can directly communicate with another terminal device without forwarding through a network device. Thus, the V2X communication has a higher spectrum efficiency and a lower transmission delay.

A terminal device can perform communication based on a V2X Policy (V2XP) configured by a core network. In some cases, for example, when the V2XP expires, the terminal device may request the core network to reconfigure the V2XP. For different communication interfaces, configuration parameters contained in the V2XP may be different. However, since the core network cannot determine which communication interface needs to have its corresponding V2XP reconfigured, the core network will reconfigure all V2XPs, thereby causing unnecessary resource overhead.

SUMMARY

The present disclosure provides a method and apparatus for obtaining a Vehicle to Everything Policy (V2XP), a terminal device, a chip, a computer-readable storage medium, and a computer program product, capable of reducing unnecessary resource overhead.

In a first aspect, a method for obtaining a V2XP is provided. The method includes: transmitting, by a terminal device, at least one of first information and second information to a Policy Control Function (PCF), the first information being used for requesting a configuration of a policy for V2X communication over a PC5 interface, and the second information being used for requesting a configuration of a policy for V2X communication over a Uu interface; and receiving, by the terminal device from the PCF, at least one of the policy corresponding to the first information and the policy corresponding to the second information.

In a second aspect, a method for obtaining a V2XP is provided. The method includes: receiving, by a Policy Control Function (PCF), at least one of first information and second information from a terminal device, the first information being used for requesting a configuration of a policy for V2X communication over a PC5 interface, and the second information being used for requesting a configuration of a policy for V2X communication over a Uu interface; and transmitting, by the PCF to the terminal device, at least one of the policy corresponding to the first information and the policy corresponding to the second information.

In a third aspect, an apparatus for obtaining a V2XP is provided. The apparatus may implement a function corresponding to the method according to the first aspect. The function may be implemented by hardware, or in a manner of executing corresponding software by hardware. The hardware or software includes one or more units or modules corresponding to the above function.

In a possible design, the apparatus is a terminal device or a chip. The apparatus may include a processing unit and a transceiving unit. When the apparatus is a terminal device, the processing unit may be a processor, and the transceiving unit may be a transceiver. The terminal device may further include a storage unit. The storage unit may be a memory. The storage unit is configured to store instructions. The processing unit executes the instructions stored in the storage unit, such that the terminal device performs the method according to the first aspect. When the apparatus is a chip in a terminal device, the processing unit may be a processor, and the transceiver unit may be an input/output interface, a pin, a circuit, and the like. The processing unit executes instructions stored in a storage unit, such that the terminal device including the chip performs the method according to the first aspect. The storage unit may be a storage unit (for example, a register, a cache, etc.) in the chip, or a storage unit (for example, a read-only memory, a random access memory, etc.) located outside the chip and in the terminal device.

In a fourth aspect, an apparatus for obtaining a V2XP is provided. The apparatus may implement a function corresponding to the method according to the second aspect. The function may be implemented by hardware, or in a manner of executing corresponding software by hardware. The hardware or software includes one or more units or modules corresponding to the above function.

In a possible design, the apparatus is a network device or a chip. The apparatus may include a processing unit and a transceiving unit. When the apparatus is a network device, the processing unit may be a processor, and the transceiving unit may be a transceiver. The network device may further include a storage unit. The storage unit may be a memory. The storage unit is configured to store instructions. The processing unit executes the instructions stored in the storage unit, such that the network device performs the method according to the second aspect. When the apparatus is a chip in a network device, the processing unit may be a processor, and the transceiver unit may be an input/output interface, a pin, a circuit, and the like. The processing unit executes the instructions stored in a storage unit, such that the network device including the chip executes the method according to the second aspect. The storage unit may be a storage unit (for example, a register, a cache, etc.) in the chip, or a storage unit (for example, a read-only memory, a random access memory, etc.) located outside the chip and in the network device.

In a fifth aspect, a computer-readable storage medium is provided. A computer program is stored in the computer-readable storage medium. When the computer program is executed by a processor, the processor performs the method according to the first aspect.

In a sixth aspect, a computer-readable storage medium is provided. A computer program is stored in the computer-readable storage medium. When the computer program is executed by a processor, the processor performs the method according to the second aspect.

In a seventh aspect, a computer program product including a computer program codes is provided. When the computer program code is executed by a processor, the processor performs the method according to the first aspect.

In an eighth aspect, a computer program product including a computer program code is provided. When the computer program code is executed by a processor, the processor performs the method according to the second aspect.

In a ninth aspect, a computer program is provided. When the computer program is executed on a computer, the computer is caused to perform the method according to the first aspect.

In a tenth aspect, a computer program is provided. When the computer program is executed on a computer, the computer is caused to perform the method according to the second aspect.

DESCRIPTION OF EMBODIMENTS

The technical solutions according to embodiments of the present disclosure will be described below in combination with the accompanying drawings of the embodiments of the present disclosure. Obviously, the embodiments described here are only part of the embodiments of the present disclosure, rather than all embodiments of the present disclosure. Based on the embodiments of the present disclosure, all other embodiments obtained by those skilled in the art without creative labor fall within the scope of the present disclosure.

Figure 1:
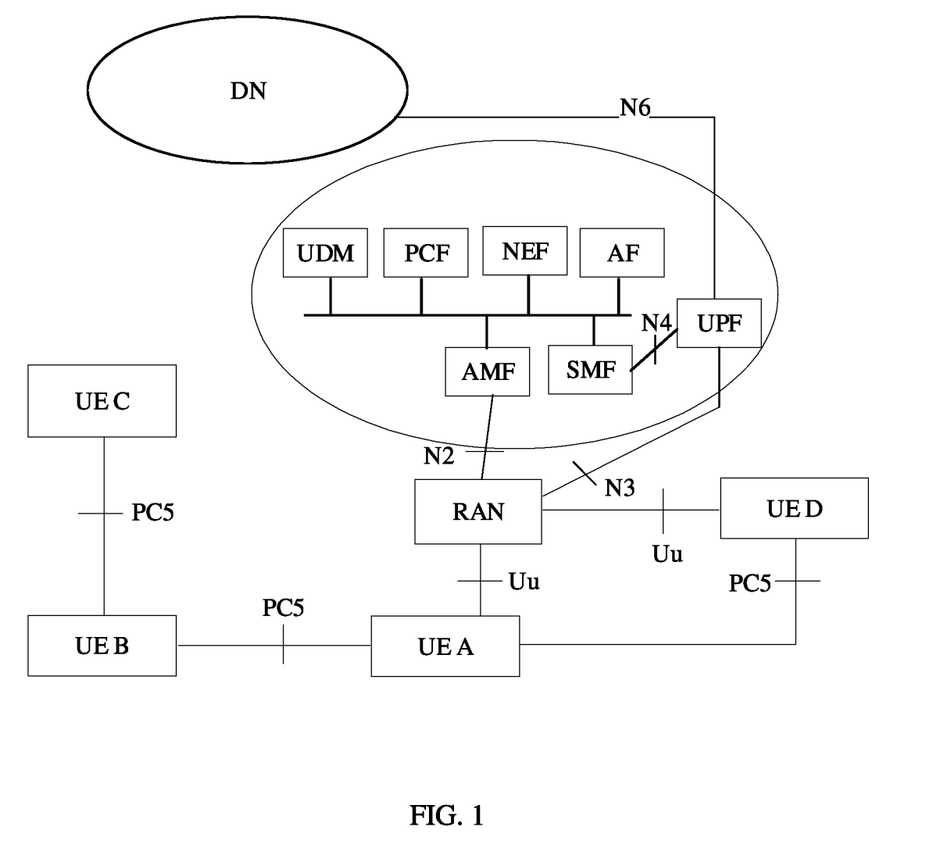
FIG. 1 is a schematic diagram illustrating a communication system applied in the present disclosure.

FIG. 1 is a schematic diagram illustrating a communication system applied in the present disclosure. Network elements in FIG. 1 will be briefly introduced below.

User Equipment (UE) A and UE B are vehicles or vehicle-mounted communication devices. UE C is a terminal device used by a pedestrian, such as a mobile phone, a wearable device, and the like. UE D is a stationary terminal device, for example, a street light.

The above UEs are several examples of terminal devices applicable to the present disclosure, and terminal devices applicable to the present disclosure are not limited to these examples. The UEs may communicate over a PC5 interface. The UEs may communicate with an access network over a Uu interface, and then communicate with a core network through the access network.

The PC5 interface is an interface defined on the basis of a sidelink. Using such an interface, UEs may directly perform communication transmission, that is, Device to Device (D2D) communication. The PC5 interface may be used in out of coverage scenarios or in coverage scenarios, but generally only authorized UEs can use the PC5 interface for communication.

The Uu interface can implement communications between a UE and a network device. That is, the UE may perform an interaction of user plane data and an interaction of control plane data with the network device over the Uu interface. The user plane data may be user service data, such as voice data and video data. The control plane data may be Radio Resource Control (RRC) messages, thereby implementing functions such as access, handover, broadcast, and paging for the UE.

A Radio Access Network (RAN) may be a 3rd Generation Partnership Project (3GPP) access network such as a base station, or a non-3GPP access network. Main functions of the RAN may include radio resource management, uplink and downlink data classification and Quality of Service (QoS) applications, cooperation with control plane network elements for signaling processing, and cooperation with user plane network elements for data forwarding Main functions of an Access and Mobility Management Function (AMF) may include an endpoint of a wireless access network control plane, an endpoint of non-access signaling, mobility management, lawful interception, access authorization/authentication, and the like.

Main functions of a Session Management Function (SMF) may include session management, Internet Protocol (IP) address allocation and management of UE, selection of functions of a manageable user plane, an endpoint of a policy control and charging function interface, downlink data notification, and the like.

Main functions of a User Plane Function (UPF) may include packet routing and forwarding, QoS processing of user plane data, and the like.

Main functions of Unified Data Management (UDM) may include generation of a 3GPP authentication certificate/ authentication parameter, storage and management of a permanent user identity of a 5G system, and subscription information management.

Main functions of a Policy Control Function (PCF) may include providing a UE, an AMF and a SMF with a parameter related to a UE policy, a parameter related to an access and mobility management policy, and a parameter related to a session management policy, respectively. In Vehicle to Everything (V2X), the PCF provides information such as V2X-related authentication and policy parameters to the UE and RAN.

Main functions of a Network Exposure Function (NEF) may include an exposure of data in a network to a third-party application server, or a reception of data provided by the third-party application server for the network.

An Application Function (AF) is equivalent to a third-party application server. Main functions of the AF may include initiation of transmission of multicast data.

Main functions of a Data Network (DN) may include transmitting data to and receiving data from a network such as the Internet.

N2, N3, N4, and N6 are communication interfaces between network elements. N2 is a communication interface between the RAN and the AMF, N3 is a communication interface between the RAN and the UPF, N4 is a communication interface between the SMF and the UPF, and N6 is a communication interface between the UPF and the DN.

Figure 2:
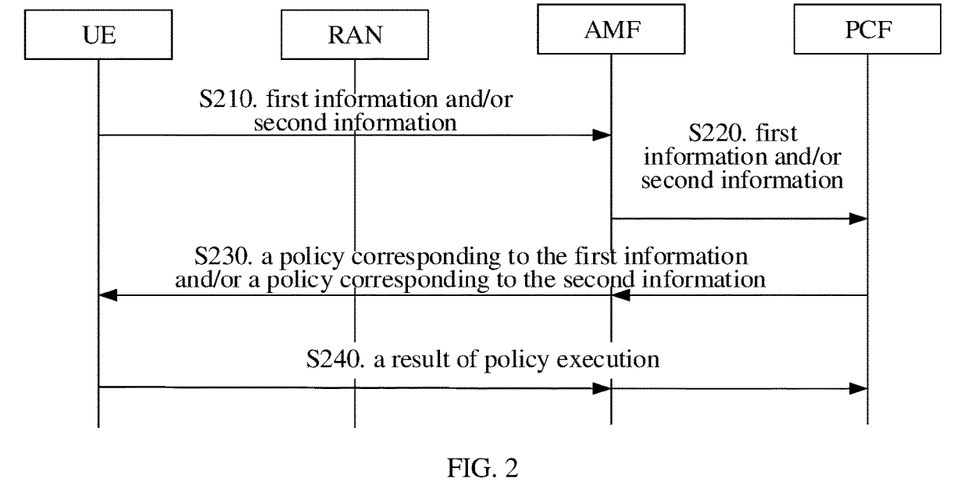
FIG. 2 is a schematic diagram illustrating a method for obtaining a Vehicle to Everything Policy (V2XP) according to an embodiment of the present disclosure.

A method for obtaining a Vehicle to Everything Policy (V2XP) according to the embodiments of the present disclosure will be described below. As illustrated in FIG. 2, the method includes the following steps.

At S210, the UE transmits first information and/or second information to the AMF. The first information is used for requesting a configuration of a policy for V2X communication over a PC5 interface, and the second information is used for requesting a configuration of a policy for V2X communication over a Uu interface. When all V2XPs are requested, the first information and the second information may also be replaced by one parameter. The parameter indicates requesting all V2XPs.

The first information and/or the second information may be placed in a container that is transparent to the AMF. The transparent container may be, for example, a UE policy provisioning request. The first information and the second information may be carried in one request message, or may be carried in two request messages. The two cases will be respectively introduced below.

Case 1

The first information and the second information are carried in two request messages. Content of the two request messages is as shown in Table 1 and Table 2.

TABLE 1

| Configuration for PC5 request message content | | | | | |
|---|---|---|---|---|---|
| Information Element Identifier (IEI) | Information Element | Type/Reference | Presence | Format | Length |
| | PTI | Procedure transaction identity | M | V | 1 |
| | Configuration for PC5 request message identity | UE policy delivery message type | M (mandatory) | V | 1 |
| | PC5 V2XP request indication | | O (optional) | | |

TABLE 2

| Configuration for Uu request message content | | | | | |
|---|---|---|---|---|---|
| IEI | Information Element | Type/Reference | Presence | Format | Length |
| | PTI | Procedure transaction identity | M | V | 1 |
| | Configuration for Uu request message identity | UE policy delivery message type | M | V | 1 |
| | Uu V2XP request indication | | O | | |

A type of a message that carries the first information or the second information is as shown in Table 3. The type of the message may be, for example, a UE policy delivery service message type.

TABLE 3

| Bits | |
|---|---|
| 8 7 6 5 4 3 2 1 | |
| 0 0 0 0 0 0 0 0 | Reserved |
| 0 0 0 0 0 0 0 1 | MANAGE UE POLICY COMMAND message |
| 0 0 0 0 0 0 1 0 | MANAGE UE POLICY COMPLETE message |
| 0 0 0 0 0 0 1 1 | MANAGE UE POLICY COMPLETE REJECT message |
| 0 0 0 0 0 1 0 0 | UE STATE INDICATION message |
| 0 0 0 0 0 1 0 1 | Configuration for PC5 request message |
| 0 0 0 0 0 1 1 0 | Configuration for Uu request message |

All other values are reserved

Case 2

The first information and the second information are carried in one request message.

1) When the first information and the second information are two parameters in the request message, content of the request message is as shown in Table 4.

TABLE 4

V2X configuration request message content

| IEI | Information Element | Type/Reference | Presence | Format | Length |
|---|---|---|---|---|---|
| | PTI | Procedure transaction identity | M | V | 1 |
| | Configuration for Uu request message identity | UE policy delivery message type | M | V | 1 |
| | PC5 Interface indication | | Optional | | |
| | Uu Interface indication | | Optional | | |

A type of a message that carries the first information and the second information is as shown in Table 5. The type of the message may be, for example, a UE policy delivery service message type.

TABLE 5

| Bits | |
|---|---|
| 8 7 6 5 4 3 2 1 | |
| 0 0 0 0 0 0 0 0 | Reserved |
| 0 0 0 0 0 0 0 1 | MANAGE UE POLICY COMMAND message |
| 0 0 0 0 0 0 1 0 | MANAGE UE POLICY COMPLETE message |
| 0 0 0 0 0 0 1 1 | MANAGE UE POLICY COMPLETE REJECT message |
| 0 0 0 0 0 1 0 0 | UE STATE INDICATION message |
| 0 0 0 0 0 1 0 1 | V2X configuration request message |

All other values are reserved

The Information Element of the PC5 Interface indication in Table 4 is as shown in Table 6 and Table 7.

TABLE 6

| 8 | 7 | 6 | 5 | 4 | 3 | 2 | 1 | |
|---|---|---|---|---|---|---|---|---|
| PC5 Interface indication IEI) | | | | PC5 Interface indication | | | | octet 1 |

TABLE 7

PC5 Interface indication (octet 1, bit 1 to 4)

| Bit | | | | |
|---|---|---|---|---|
| 0 | 0 | 0 | 1 | Request |

In Table 6, the PC5 Interface indication occupies four bits of one octet, that is, bit 1 to bit 4. A value of the four bits is as shown in Table 7. When the value of the bits is 0001, it indicates that the UE requests a configuration of a V2XP of the PC5 interface. When the value of the bits is another value, it indicates that the UE does not request the configuration of the V2XP of the PC5 interface.

The Information Element of the PC5 Interface indication in Table 4 is as shown in Table 8 and Table 9.

TABLE 8

| 8 | 7 | 6 | 5 | 4 | 3 | 2 | 1 | |
|---|---|---|---|---|---|---|---|---|
| Uu Interface indication IEI | | | | Uu Interface indication | | | | octet 1 |

TABLE 9

Uu Interface indication (octet 1, bit 1 to 4)

| Bit | | | | |
|---|---|---|---|---|
| 0 | 0 | 0 | 1 | Requeest |

In Table 8, the Uu Interface indication occupies four bits of one octet, that is, bit 1 to bit 4. A value of the four bits is as shown in Table 9. When the value of the bits is 0001, it indicates that the UE requests a configuration of a V2XP of the Uu interface. When the value of the bits is another value, it indicates that the UE does not request the configuration of the V2XP of the Uu interface.

2) When the first information and the second information are two bits in one request message, content of the request message is as shown in Table 10.

TABLE 10

V2X configuration request message content

| IEI | Information Element | Type/Reference | Presence | Format | Length |
|---|---|---|---|---|---|
|  | PTI | Procedure transaction Identity | M | V | 1 |
|  | Configuration for Uu request message identity Interface indication | UE policy delivery message type | M | V | 1 |

A type of a message that carries the first information and the second information is as shown in Table 11. The type of the message may be, for example, a UE policy delivery service message type.

TABLE 11

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | Reserved |
| 0 | 0 | 0 | 0 | 0 | 0 | 0 | 1 | MANAGE UE POLICY COMMAND message |
| 0 | 0 | 0 | 0 | 0 | 0 | 1 | 0 | MANAGE UE POLICY COMPLETE message |
| 0 | 0 | 0 | 0 | 0 | 0 | 1 | 1 | MANAGE UE POLICY COMPLETE REJECT message |
| 0 | 0 | 0 | 0 | 0 | 1 | 0 | 0 | UE STATE INDICATION message |
| 0 | 0 | 0 | 0 | 0 | 1 | 0 | 1 | V2X configuration request message |

All other values are reserved

The Information Element of the Interface indication in Table 10 is as shown in Table 12 and Table 13.

TABLE 12

| 8 | 7 | 6 | 5 | 4 | 3 | 2 | 1 | |
|---|---|---|---|---|---|---|---|---|
| Interface indication IEI | | | | Interface indication | | | | octet 1 |

TABLE 13

Uu Interface indication (octet 1, bit 1 to 4)

| Bit | | | | |
|---|---|---|---|---|
| 0 | 0 | 0 | 1 | PC5 |
| 0 | 0 | 1 | 0 | Uu |
| 0 | 0 | 1 | 1 | Both |

In Table 12, the Interface indication occupies four bits of one octet, that is, bit 1 to bit 4. A value of the four bits is as shown in Table 13. When the value of the bits is 0001, it indicates that the UE requests the configuration of the V2XP of the PC5 interface. When the value of the bits is 0010, it indicates that the UE requests the configuration of the V2XP of the Uu interface. When the value of the bits is 0011, it indicates that the UE requests a configuration of a V2XP of the PC5 interface and the Uu interface.

The Information Element of the Interface indication in Table 10 may also adopt forms shown in Table 14 and Table 15.

TABLE 14

| 8 | 7 | 6 | 5 | 4 | 3 | 2 | 1 | |
|---|---|---|---|---|---|---|---|---|
| Interface indication IEI | | | Uu | | PC5 | | | octet 1 |

TABLE 15

Uu Interface indication (octet 1, bit 1 to 4)

| Bit 1 to 2 | | |
|---|---|---|
| 0 | 1 | request |
| Bit 3 to 4 | | |
| 0 | 1 | request |

In Table 14, the Interface indication occupies four bits of one octet, that is, bit 1 to bit 4. A value of the four bits is as shown in Table 15. When the value of bit 1 and bit 2 is 01, it indicates that the UE requests the configuration of the V2XP of the PC5 interface. When the value of bit 3 and bit 4 is 01, it indicates that the UE requests the configuration of the V2XP of the Uu interface.

At S220, the AMF forwards the received first information and/or second information to the PCF.

At S230, the PCF determines a policy corresponding to the first information and/or a policy corresponding to the second information based on the received first information and/or second information, and transmits the policy corresponding to the first information and/or the policy corresponding to the second information to the terminal device.

When the PCF receives the first information, the PCF transmits the policy corresponding to the first information to the UE. When the PCF receives the second information, the PCF transmits the policy corresponding to the second information to the UE. When the PCF receives the first information and the second information, the PCF transmits the policy corresponding to the first information and the policy corresponding to the second information to the UE.

For example, when the PCF receives information for requesting the configuration of the V2XP of the PC5 interface, the PCF transmits the V2XP of the PC5 interface to the UE. When the PCF receives information for requesting the configuration of the V2XP of the Uu interface, the PCF transmits the V2XP of the Uu interface to the UE. When the PCF receives the information for requesting the configuration of the PC5 interface and the information for requesting the configuration of the Uu interface, the PCF transmits the V2XP of the PC5 interface and the V2XP of the Uu interface to the UE.

In the above examples, the UE may request updating V2XPs in a targeted manner. When a part of the V2XPs expires, the UE may transmit a request message for requesting a configuration of the part of the V2XPs. When all of the V2XPs expire, the UE may transmit a request message for requesting a configuration of all of the V2XPs. The PCF may configure the V2XPs required by the UE in accordance with the request message from the UE, thereby avoiding unnecessary resource overhead caused by reconfiguring all of the V2XPs.

In at least one embodiment, a V2XP transmitted by the PCF includes expiration time of the policy.

For example, when the PCF receives the information for requesting the configuration of the V2XP of the PC5 interface, the PCF transmits expiration time of the V2XP of the PC5 interface to the UE. When the PCF receives the information for requesting the configuration of the V2XP of the Uu interface, the PCF transmits expiration time of the V2XP of the Uu interface to the UE. When the PCF receives the information for requesting the configuration of the PC5 interface and the information for requesting the configuration of the Uu interface, the PCF transmits the expiration time of the V2XP of the PC5 interface and the expiration time of the V2XP of the Uu interface to the UE, or the PCF transmits to the UE expiration time applicable to the all V2XPs. When expiration time corresponding to a policy of an interface expires, the UE re-requests the PCF to configure the policy of the interface.

Table 16 to Table 18 show three possible encoding forms of a policy containing expiration time. Table 16 is applicable to the PC5 interface and the Uu interface. Table 17 is applicable to the PC5 interface. Table 18 is applicable to the Uu interface.

TABLE 16

| UE policy part when the UE policy part type is V2XP | | | | | | | |
|---|---|---|---|---|---|---|---|
| 8 | 7 | 6 | 5 | 4 | 3 | 2 | 1 |
| | | | | UE policy part contents length | | | octet 1 |
| | | | | | | | octet 2 |
| 0 | 0 | 0 | 0 | UE policy part type = {V2XP} | | | octet 3 |
| spare | | | | | | | |
| | | | | Expiration time | | | octet 4 |
| | | | | | | | octet 9 |
| | | | | UE policy part contents = {V2XP contents} | | | octet 10 |
| | | | | | | | octet x |

TABLE 17

| V2XP info = {UE policies for V2X communication over PC5} | | | | | | | |
|---|---|---|---|---|---|---|---|
| 8 | 7 | 6 | 5 | 4 | 3 | 2 | 1 |
| 0 | 0 | 0 | 0 | V2XP info type = {UE policies for V2X communication over PC5} | | | octet k |
| spare | | | | | | | |
| | | | | Expiration time | | | octet k + 1 |
| | | | | | | | octet k + 5 |
| | | | | Length of V2XP info contents | | | octet k + 6 |
| | | | | | | | octet k + 7 |
| | | | | V2XP info contents = {UE policies for V2X communication over PC5 contents} | | | octet k + 8 |
| | | | | | | | octet 1 |

TABLE 18

| V2XP info = {UE policies for V2X communication over Uu} | | | | | | | |
|---|---|---|---|---|---|---|---|
| 8 | 7 | 6 | 5 | 4 | 3 | 2 | 1 |
| 0 | 0 | 0 | 0 | V2XP info type = {UE policies for V2X communication over Uu} | | | octet k |
| spare | | | | | | | |
| | | | | Expiration time | | | octet k + 1 |
| | | | | | | | octet k + 5 |
| | | | | Length of V2XP info contents | | | octet k + 6 |
| | | | | | | | octet k + 7 |
| | | | | V2XP info contents = {UE policies for V2X communication over Uu contents} | | | octet k + 8 |
| | | | | | | | octet 1 |

Expiration time (octet k+1 to k+5) shall be set as a 40 bits unsigned integer value indicating a UTC time, in seconds since midnight UTC of Jan. 1, 1970.

At S240, after receiving the V2XP, the UE may transmit a reply message to the PCF. The reply message includes a result of execution of the policy corresponding to the first information and/or the policy corresponding to the second information. If a certain policy cannot be executed due to grammatical errors and the like causes, the UE needs to carry an identity of the policy, a service corresponding to the policy, etc. in the reply message, such that the core network can take corresponding measures.

It is to be noted that the method illustrated in FIG. 2 is only a schematic flowchart, and the method for obtaining the V2XP may further include more detailed steps. Those skilled in the art can perform the method for obtaining the V2XP according to the embodiments of the present disclosure in combination with FIG. 2 and the related art.

The above description has explained an example of the method for obtaining the V2XP provided by the present disclosure in detail. It can be understood that, in order to perform the above functions, an apparatus for obtaining V2XP includes a hardware structure and/or a software module for performing respective functions. It is conceivable for those skilled in the art that, in combination with units and algorithm steps of examples described in the embodiments disclosed herein, the embodiments of the present disclosure can be implemented in a form of hardware or a combination of hardware and computer software. Whether a certain function is implemented by hardware or by computer software driving the hardware depends on specific applications and design constraints of technical solutions. Professionals and technicians can use different methods for different specific applications to implement the described functions, but such implementation should not be considered to go beyond the scope of the present disclosure.

An embodiment of the present disclosure can divide the apparatus for obtaining the V2XP into functional units based on the above method examples. For example, each function can be divided into a functional unit, or two or more functions can be integrated into one processing unit. The above integrated unit can be implemented either in the form of hardware or in a form of a software functional unit. It is to be noted that the division of units in the embodiments of the present disclosure is illustrative, and is merely a logical function division. Other division methods may be adopted in actual implementations.

Figure 3:
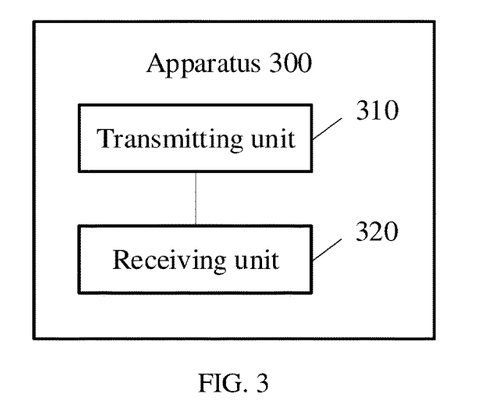
FIG. 3 is a schematic diagram illustrating a structure of an apparatus for obtaining a V2XP according to an embodiment of the present disclosure.

FIG. 3 is a schematic diagram illustrating a structure of an apparatus for obtaining a V2XP according to an embodiment of the present disclosure. The apparatus 300 includes a transmitting unit 310 and a receiving unit 320. The transmitting unit 310 may perform a transmitting step under control of a processing unit, and the receiving unit 320 may perform a receiving step under the control of the processing unit.

The transmitting unit 310 is configured to transmit at least one of first information and second information to a PCF. The first information is used for requesting a configuration of a policy for V2X communication over a PC5 interface. The second information is used for requesting a configuration of a policy for V2X communication over a Uu interface.

The receiving unit 320 is configured to receive at least one of the policy corresponding to the first information and the policy corresponding to the second information from the PCF.

In at least one embodiment, the first information is carried in a first request message, and the second information is carried in a second request message.

In at least one embodiment, the first information and the second information are carried in one request message.

In at least one embodiment, the first information is a first bit in the one request message, and the second information is a second bit in the one request message.

In at least one embodiment, the at least one of the policy corresponding to the first information and the policy corresponding to the second information includes at least one of the following parameters: expiration time of the policy for the V2X communication over the PC5 interface; and expiration time of the policy for the V2X communication over the Uu interface.

In at least one embodiment, the transmitting unit 310 is further configured to transmit a reply message to the PCF. The reply message includes a result of execution of the at least one of the policy corresponding to the first information and the policy corresponding to the second information.

In at least one embodiment, when an error occurs in the execution of any of the at least one of the policy corresponding to the first information and the policy corresponding to the second information, the result of the execution includes an identity of the policy having the error occurring in the execution thereof and a service corresponding to the policy having the error occurring in the execution thereof.

In at least one embodiment, the at least one of the first information and the second information is carried in a container that is transparent to an AMF.

Figure 4:
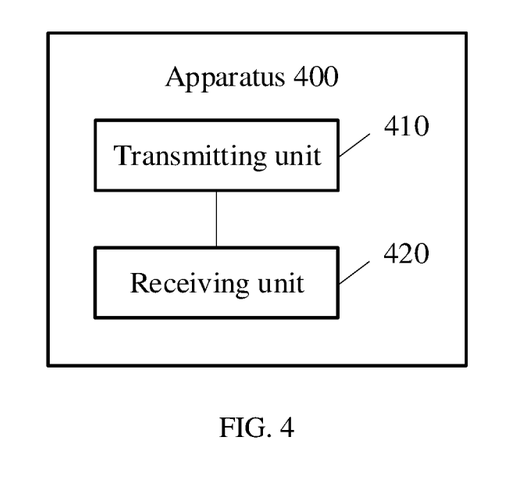
FIG. 4 is a schematic diagram illustrating a structure of another apparatus for obtaining a V2XP according to an embodiment of the present disclosure.

FIG. 4 is a schematic diagram illustrating a structure of another apparatus for obtaining a V2XP according to an embodiment of the present disclosure. The apparatus 400 includes a transmitting unit 410 and a receiving unit 420. The transmitting unit 410 may perform a transmitting step under control of a processing unit, and the receiving unit 420 may perform a receiving step under the control of the processing unit.

The receiving unit 420 is configured to receive at least one of first information and second information from a terminal device. The first information is used for requesting a configuration of a policy for V2X communication over a PC5 interface. The second information is used for requesting a configuration of a policy for V2X communication over a Uu interface.

The transmitting unit 420 is configured to transmit at least one of the policy corresponding to the first information and the policy corresponding to the second information to the terminal device.

In at least one embodiment, the first information is carried in a first request message, and the second information is carried in a second request message.

In at least one embodiment, the first information and the second information are carried in one request message.

In at least one embodiment, the first information is a first bit in the one request message, and the second information is a second bit in the one request message.

In at least one embodiment, at least one of the policy corresponding to the first information and the policy corresponding to the second information includes at least one of the following parameters: expiration time of the policy for the V2X communication over the PC5 interface; and expiration time of the policy for the V2X communication over the Uu interface.

In at least one embodiment, the receiving unit 410 is further configured to receive a reply message from the terminal device. The reply message includes a result of execution of the at least one of the policy corresponding to the first information and the policy corresponding to the second information.

In at least one embodiment, when an error occurs in the execution of any of the at least one of the policy corresponding to the first information and the policy corresponding to the second information, the result of the execution includes an identity of the policy having the error occurring in the execution thereof and a service corresponding to the policy having the error occurring in the execution thereof.

In at least one embodiment, the at least one of the first information and the second information is carried in a container that is transparent to an AMF.

Figure 5:
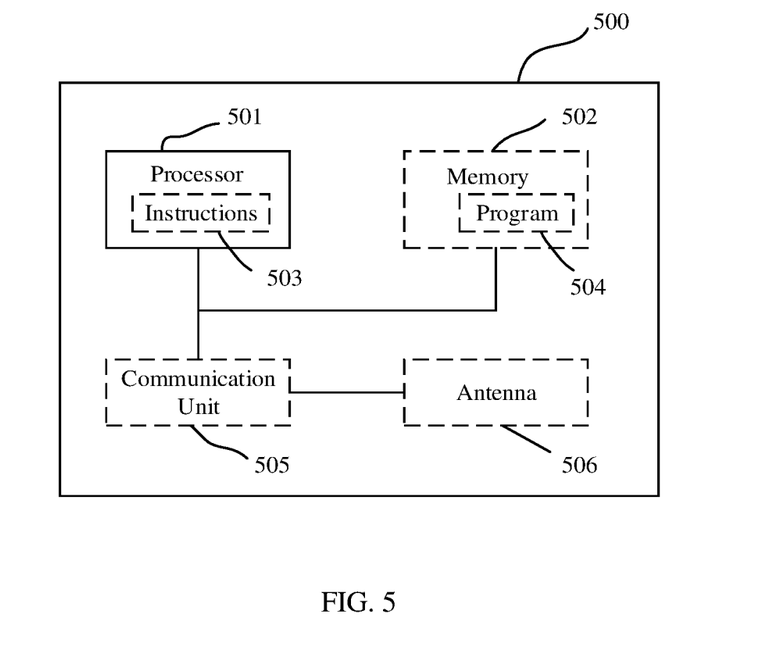
FIG. 5 is a schematic diagram illustrating a device for obtaining a V2XP according to an embodiment of the present disclosure.

FIG. 5 is a schematic diagram illustrating a structure of a device for obtaining a V2XP according to an embodiment of the present disclosure. In FIG. 5, a unit or a module represented by a dotted line indicates that the unit or the module is optional. The device 500 may be configured to perform the method described in the above method embodiments. The device 500 may be a terminal device, a network device, or a chip.

The device 500 includes one or more processors 501. The one or more processors 501 may support the device 500 to perform the method according to the method embodiment corresponding to FIG. 2. The processor 501 may be a general-purpose processor or a dedicated processor. For example, the processor 501 may be a Central Processing Unit (CPU). The CPU may be configured to control the device 500, execute a software program, and process data of the software program. The device 500 may further include a communication unit 505 for implementing signal input (receiving) and output (transmitting).

For example, the device 500 may be a chip. The communication unit 505 may be an input and/or output circuit of the chip, or the communication unit 505 may be a communication interface of the chip. The chip may be embodied as a component of the terminal device or the network device or other wireless communication devices.

For another example, the device 500 may be a terminal device. The communication unit 505 may be a transceiver of the terminal device, or the communication unit 505 may be a transceiver circuit of the terminal device.

For another example, the device 500 may be a network device. The communication unit 505 may be a transceiver of the network device, or the communication unit 505 may be a transceiver circuit of the network device.

The device 500 may include one or more memories 502 having a program 504 stored thereon. The program 504 may be executed by the processor 501 to generate instructions 503, such that the processor 501 performs the method described in the above method embodiments in accordance with the instructions 503. In at least one embodiment, data may also be stored in the memory 502. In at least one embodiment, the processor 501 may also read data stored in the memory 502. The data may be stored either at the same storage address as the program 504, or at a storage address different from that of the program 504.

The processor 501 and the memory 502 may be arranged separately or integrated together. For example, the processor 501 and the memory 502 may be integrated on a System On Chip (SOC) of the terminal device.

The device 500 may further include an antenna 506. The communication unit 505 may implement a transceiving function of the device 500 through the antenna 506.

For a specific manner and beneficial effects of performing the method for obtaining the V2XP by the processor 501, reference may be made to related description in the method embodiments.

It should be understood that each step of the above method embodiments can be implemented by hardware logic circuits or instructions in a form of software in the processor 501. The processor 501 can be a CPU, a Digital Signal Processor (DSP), an Application Specific Integrated Circuit (ASIC), a Field Programmable Gate Array (FPGA) or another programmable logic device, such as a discrete gate, a transistor logic device, or a discrete hardware component.

An embodiment of the present disclosure further provides a computer program product. The computer program product, when being executed by the processor 501, performs the method according to any method embodiment of the present disclosure.

The computer program product such as the program 504 may be stored in the memory 502. The program 504 is finally converted into an executable object file that can be executed by the processor 501 through processing processes such as preprocessing, compilation, assembly, and linking.

An embodiment of the present disclosure further provides a computer-readable storage medium having a computer program stored thereon. The computer program, when being executed by a computer, performs the method according to any method embodiment of the present disclosure. The computer program can be a high-level language program or an executable target program.

The computer-readable storage medium may be, for example, the memory 502. The memory 502 may be a volatile memory or a non-volatile memory, or the memory 502 may include both a volatile memory and a non-volatile memory. The non-volatile memory can be a Read-Only Memory (ROM), a Programmable ROM (PROM), an Erasable PROM (EPROM), an Electrically EPROM (EEPROM) or a flash memory. The volatile memory may be a Random Access Memory (RAM), which is used as an external cache. By way of exemplary rather than limiting description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

Those skilled in the art can clearly understand that, for convenience and conciseness of the description, for the specific operation processes of the apparatus and devices described above and the resulting technical effects, reference can be made to the corresponding processes and technical effects in the foregoing method embodiments, and details thereof will be omitted here.

In several embodiments provided by the present disclosure, the system, apparatus and method disclosed can be implemented in any other ways. For example, some features of the method embodiments described above can be omitted or not executed. The apparatus embodiments described above can be merely exemplary, for example, the divisions of the units are only divisions based on logical functions, and there may be other divisions in actual implementations. For example, more than one unit or component may be combined or integrated into another system. In addition, coupling between the units or coupling between the components may be direct coupling or indirect coupling. The above coupling includes electrical, mechanical, or other forms of connection.

It should be understood that, in various embodiments of the present disclosure, the values of the sequence numbers of the above processes do not imply the order in which they are performed. The order in which each process is performed should be determined by its function and internal logic. The implementation processes of the embodiments of the present disclosure are not limited to any specific order described above.

In addition, the terms "system" and "network" are often used interchangeably in the embodiments of the present disclosure. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In summary, the above description merely illustrates the embodiments of the technical solutions of the present disclosure, and is not intended to limit the scope of the present disclosure. Any modification, equivalent replacement, improvement, and the like made within the spirit and principle of the present disclosure shall be included in the scope of the present disclosure.

What is claimed is:

1. A method for obtaining a Vehicle to Everything, V2X, communication policy at a terminal device, comprising:
in response to one or more parts of a V2X policy at the terminal device expiring, transmitting, by the terminal device to a Policy Control Function, PCF, via an Access and Mobility Management function, AMF, a request message for requesting a configuration of the one or more expired parts of the V2X policy, the request comprising at least one of first information and second information,
wherein the first information is used for requesting a configuration of the V2X policy part for V2X communication over a PC5 interface when expired, and the second information is used for requesting a configuration of the V2X policy part for V2X communication over a Uu interface when expired; and
receiving, by the terminal device from the PCF via the AMF, the requested configuration of the one or more expired parts of the V2X policy.

2. The method according to claim 1, wherein the V2X policy corresponding to the first information comprises expiration time of the V2X policy for the V2X communication over the PC5 interface, and the V2X policy corresponding to the second information comprises expiration time of the V2X policy for the V2X communication over the Uu interface.

3. The method according to claim 1, wherein at least one of the first information and the second information is carried in a container that is transparent to the Access and Mobility Management Function, AMF.

4. A non-transitory computer-readable storage medium having a computer program stored thereon, the computer program causing the computer to perform the method according to claim 1.

5. The non-transitory computer-readable storage medium according to claim 4, wherein the V2X policy corresponding to the first information comprises expiration time of the V2X policy for the V2X communication over the PC5 interface, and the V2X policy corresponding to the second information comprises expiration time of the V2X policy for the V2X communication over the Uu interface.

6. The non-transitory computer-readable storage medium according to claim 4, wherein at least one of the first information and the second information is carried in a container that is transparent to the Access and Mobility Management Function, AMF.

7. A method for obtaining a Vehicle to Everything, V2X, communication policy, comprising:
    in response to one or more parts of a V2X policy expiring at a terminal, receiving, by a Policy Control Function, PCF, via an Access and Mobility Management function, AMF, a request message for requesting a configuration of the one or more expired parts of the V2X policy, the request comprising at least one of first information and second information from the terminal device, wherein the first information is used for requesting a configuration of the V2X policy part for V2X communication over a PC5 interface when expired, and the second information is used for requesting a configuration of the V2X policy part for V2X communication over a Uu interface when expired; and
    transmitting, by the PCF via the AMF to the terminal device, the requested configuration of the one or more expired parts of the V2X policy.

8. The method according to claim 7, wherein the V2X policy corresponding to the first information comprises expiration time of the V2X policy for the V2X communication over the PC5 interface, and the V2X policy corresponding to the second information comprises expiration time of the V2X policy for the V2X communication over the Uu interface.

9. The method according to claim 7, wherein the at least one of the first information and the second information is carried in a container that is transparent to the Access and Mobility Management Function, AMF.

10. The methods according to claim 7, wherein the first information and the second information are carried in one request message, and the first information is a first bit in the one request message, and the second information is a second bit in the one request message.

11. A network device, comprising:
    a memory having a computer program stored thereon; and
    a processor configured to invoke and execute the computer program stored in the memory to perform the method according to claim 7.

12. The network device according to claim 11, wherein the V2X policy corresponding to the first information comprises expiration time of the V2X policy for the V2X communication over the PC5 interface, and the V2X policy corresponding to the second information comprises expiration time of the V2X policy for the V2X communication over the Uu interface.

13. The network device according to claim 11, wherein the at least one of the first information and the second information is carried in a container that is transparent to the Access and Mobility Management Function, AMF.

14. The network device according to claim 11, wherein the first information and the second information are carried in one request message, and the first information is a first bit in the one request message, and the second information is a second bit in the one request message.

15. A non-transitory computer-readable storage medium having a computer program stored thereon, the computer program causing the computer to perform the method according to claim 7.

16. The non-transitory computer-readable storage medium according to claim 15, wherein the V2X policy corresponding to the first information comprises expiration time of the V2X policy for the V2X communication over the PC5 interface, and the V2X policy corresponding to the second information comprises expiration time of the V2X policy for the V2X communication over the Uu interface.

17. The non-transitory computer-readable storage medium according to claim 15, wherein the at least one of the first information and the second information is carried in a container that is transparent to the Access and Mobility Management Function, AMF.

18. A terminal device, comprising:
    a memory having a computer program stored thereon; and
    a processor configured to invoke and execute the computer program stored in the memory to:
    in response to one or more parts of a V2X policy at the terminal device expiring, transmit to a Policy Control Function, PCF, via an Access and Mobility Management function, AMF, a request message for requesting a configuration of the one or more expired parts of the V2X policy, the request comprising at least one of first information and second information,
    wherein the first information is used for requesting a configuration of the V2X policy part for V2X communication over a PC5 interface when expired, and the second information is used for requesting a configuration of the V2X policy part for V2X communication over a Uu interface when expired; and
    receive from the PCF via the AMF, the requested configuration of the one or more expired parts of the V2X policy.

19. The terminal device according to claim 18, wherein the V2X policy corresponding to the first information comprises expiration time of the V2X policy for the V2X communication over the PC5 interface, and the V2X policy corresponding to the second information comprises expiration time of the V2X policy for the V2X communication over the Uu interface.

20. The terminal device according to claim 18, wherein at least one of the first information and the second information is carried in a container that is transparent to the Access and Mobility Management Function, AMF.

* * * * *